(12) United States Patent
Fuse

(10) Patent No.: US 12,307,312 B2
(45) Date of Patent: May 20, 2025

(54) INFORMATION PROCESSING APPARATUS AND MEDIUM, AND INFORMATION PROCESSING SYSTEM

(71) Applicant: CANON KABUSHIKI KAISHA, Tokyo (JP)

(72) Inventor: Hiroshi Fuse, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/625,532

(22) Filed: Apr. 3, 2024

(65) Prior Publication Data

US 2024/0346276 A1   Oct. 17, 2024

(30) Foreign Application Priority Data

Apr. 12, 2023   (JP) .................................. 2023-065220

(51) Int. Cl.
*G06K 19/06*   (2006.01)
*G06K 1/12*    (2006.01)
*G06K 7/14*    (2006.01)

(52) U.S. Cl.
CPC ....... *G06K 19/06046* (2013.01); *G06K 1/121* (2013.01); *G06K 7/1417* (2013.01)

(58) Field of Classification Search
CPC .. G06K 19/06046; G06K 19/00; G06K 1/121; G06K 7/1417
USPC ...................... 235/487, 375, 462.1
See application file for complete search history.

(56) References Cited

U.S. PATENT DOCUMENTS

| | | | | |
|---|---|---|---|---|
| 2008/0278778 | A1* | 11/2008 | Saino | .................... G06F 40/103 |
| | | | | 358/505 |
| 2012/0253852 | A1* | 10/2012 | Pourfallah | ........... G06Q 20/327 |
| | | | | 705/41 |
| 2013/0206834 | A1* | 8/2013 | Itwaru | ................. G06Q 20/401 |
| | | | | 235/379 |
| 2014/0032343 | A1* | 1/2014 | Argue | .................... G06Q 30/06 |
| | | | | 705/16 |
| 2015/0227785 | A1 | 8/2015 | Wada | |
| 2020/0004469 | A1 | 1/2020 | Tomida | |
| 2020/0286062 | A1* | 9/2020 | Narita | ...................... G07G 1/12 |
| 2020/0344362 | A1 | 10/2020 | Miyamoto | |

FOREIGN PATENT DOCUMENTS

| | | | |
|---|---|---|---|
| JP | 2005-165795 A | 6/2005 | |
| JP | 2006-209588 A | 8/2006 | |
| JP | 2006-227748 A | 8/2006 | |

(Continued)

OTHER PUBLICATIONS

Japanese Office Action issued Jul. 5, 2024 in corresponding Japanese Patent Application No. 2023-065220 (English translation not available).

*Primary Examiner* — Edwyn Labaze
(74) *Attorney, Agent, or Firm* — VENABLE LLP

(57) ABSTRACT

An information processing apparatus acquires a data list from an external service, determines whether an image is associated with data selected from the acquired data list, acquires an image to be associated with the selected data in a case where determination is made that no image is associated with the selected data, saves the selected data and the acquired image in association with each other, and generates and save a two dimensional code in which a saving destination of the image is encoded.

8 Claims, 8 Drawing Sheets

(56) References Cited

FOREIGN PATENT DOCUMENTS

| | | |
|---|---|---|
| JP | 2014-38561 A | 2/2014 |
| JP | 2015-210766 A | 11/2015 |
| JP | 2016-4456 A | 1/2016 |
| JP | 2019-128832 A | 8/2019 |
| JP | 2020-1253 A | 1/2020 |
| JP | 2020-182020 A | 11/2020 |
| JP | 2021-196663 A | 12/2021 |

* cited by examiner

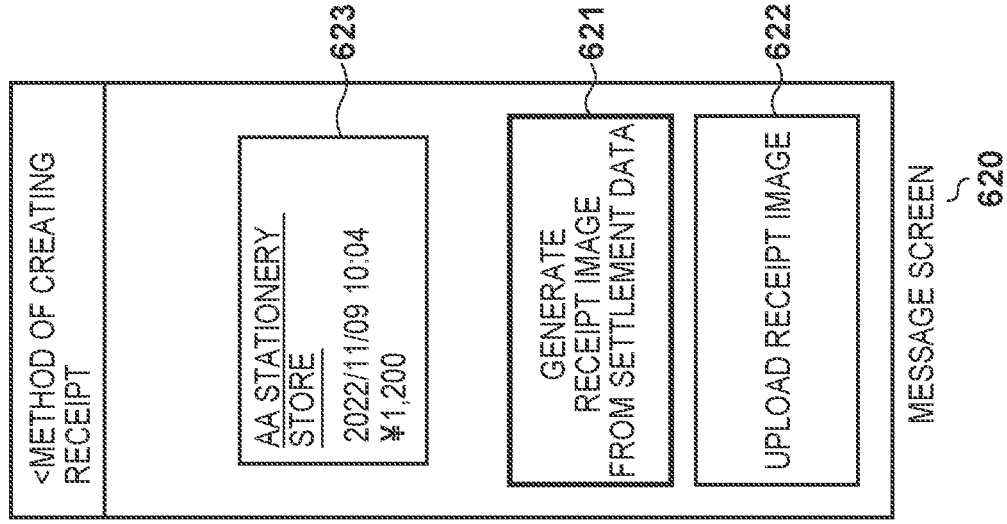
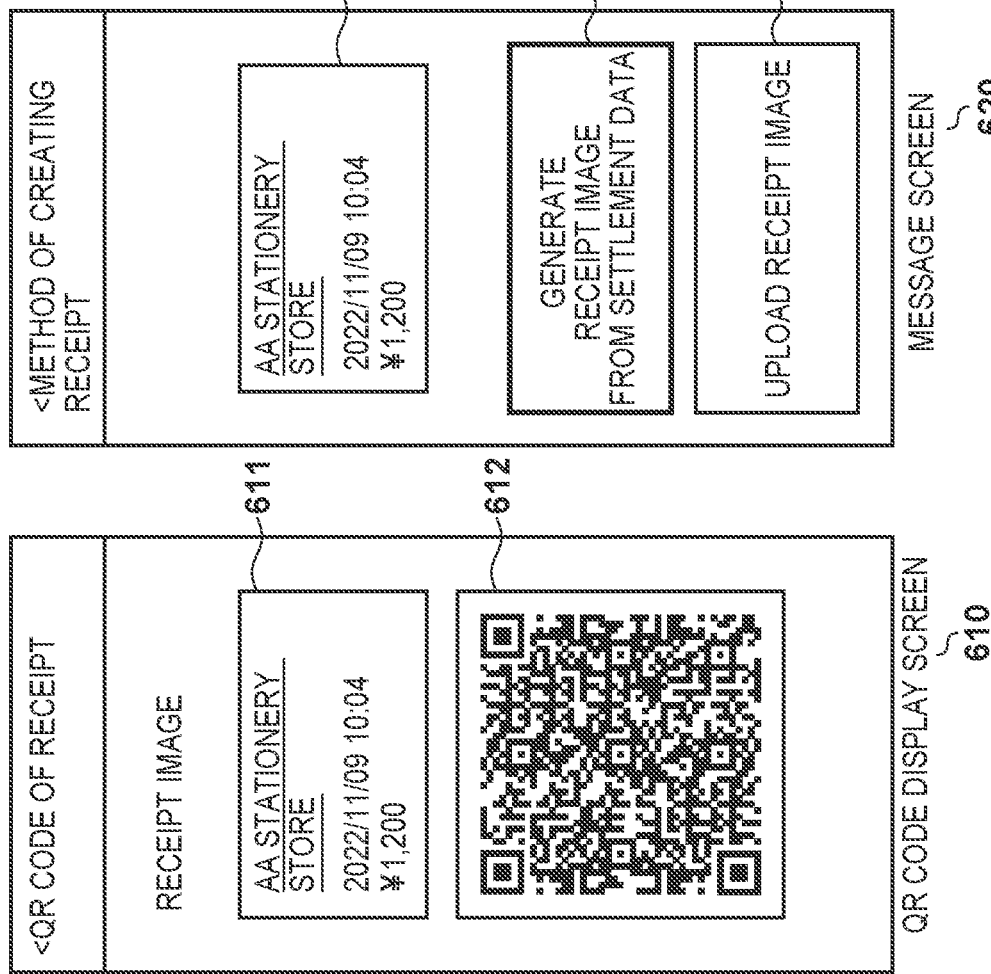
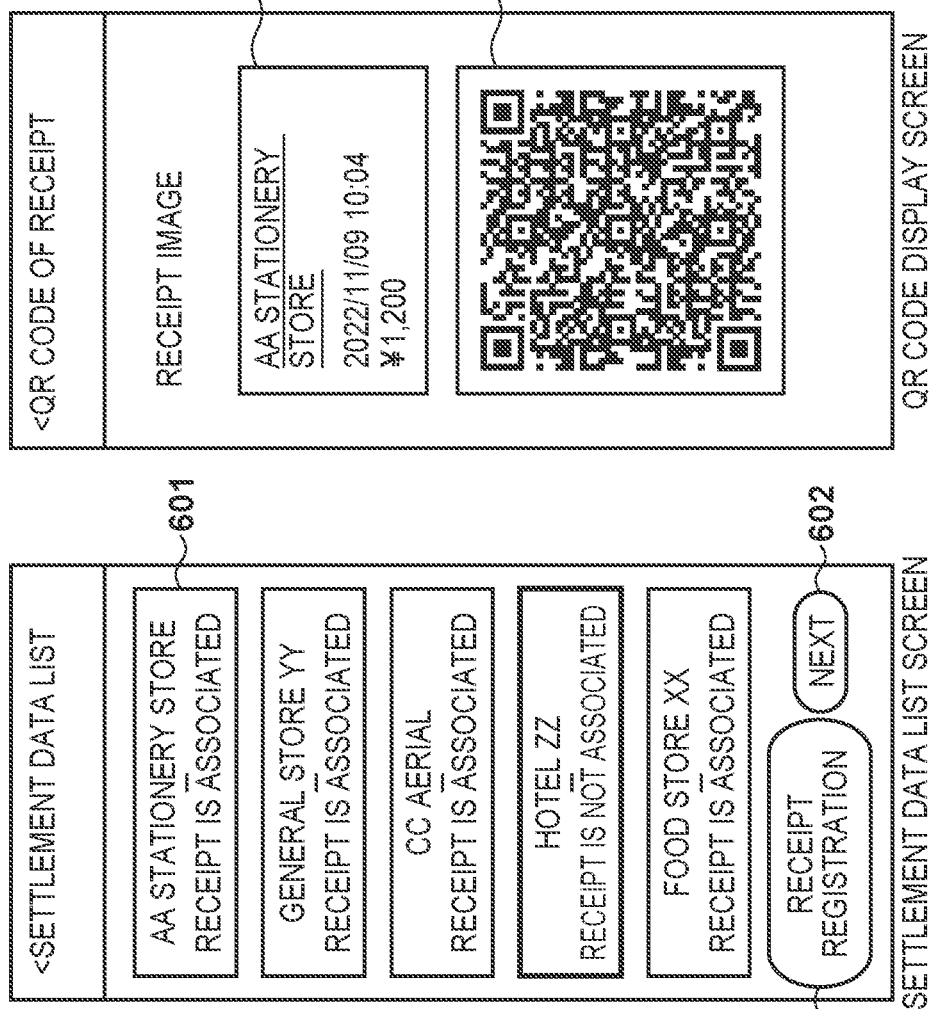

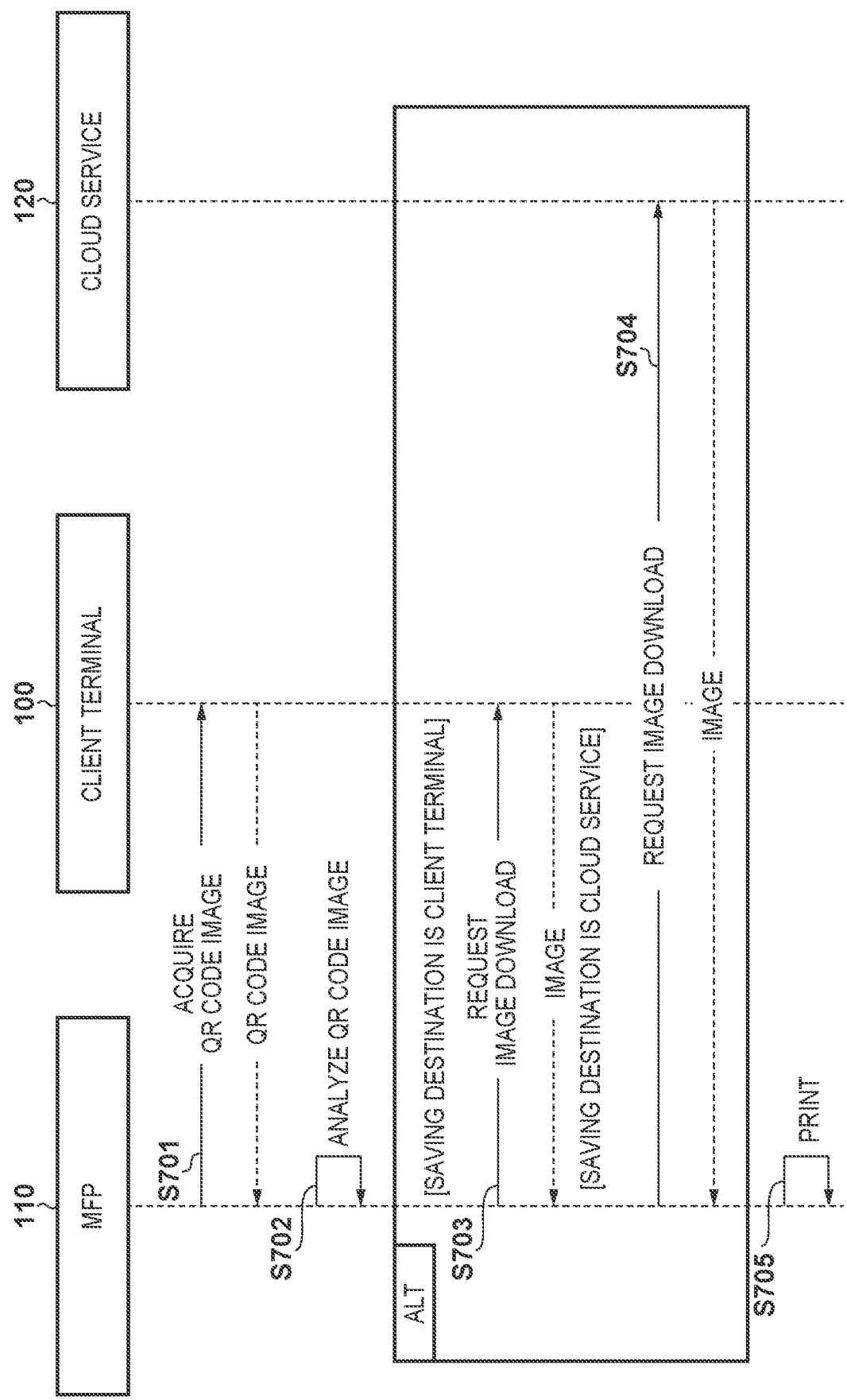

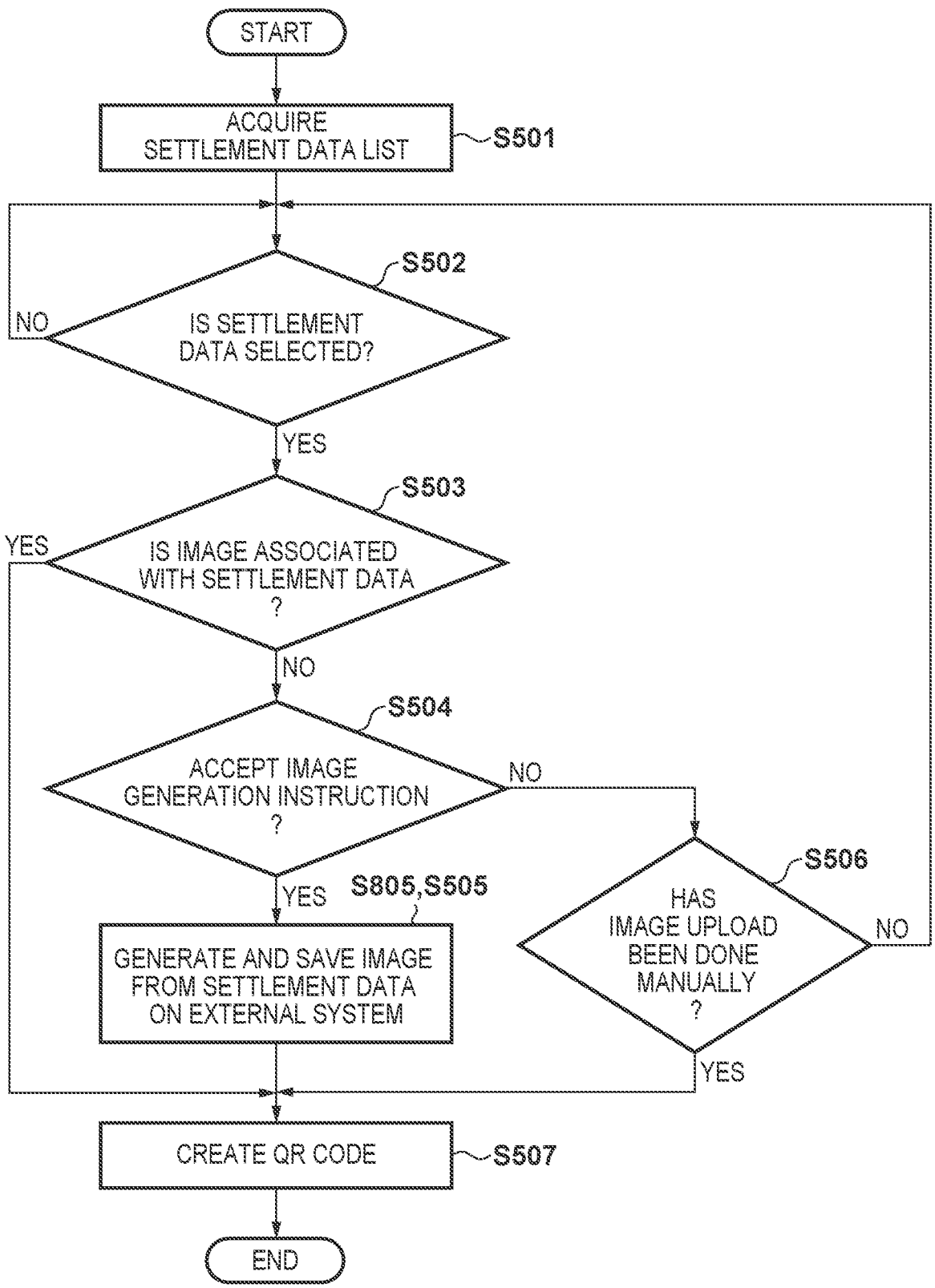

INFORMATION PROCESSING APPARATUS AND MEDIUM, AND INFORMATION PROCESSING SYSTEM

BACKGROUND OF THE INVENTION

Field of the Invention

The present invention relates to an information processing apparatus and a medium, and an information processing system.

Description of the Related Art

In recent years, with the spread of cashless services, opportunities to use cashless settlement via smartphones have increased. The cashless service is widely used in business sites, and the accounting department of a company requires efficient and accurate expense process not only for cash settlement but also for cashless settlement. However, there is a case where a receipt is not issued in cashless settlement. In preparation for such a case, a company that is an issuing source of a receipt provides a mechanism that can issue a receipt from a web page. For example, a user who has used a hotel can refer to a usage history from a web page of the hotel and issue a receipt as an image.

Japanese Patent Laid-Open No. 2021-196663 describes a system for collectively transmitting settlement data and a receipt image to an expense adjustment service. When this system is used, the user uploads the issued receipt image to the cashless service, so that the cashless service can transmit the settlement data and the receipt image to the expense adjustment service in an appropriately associated manner.

Furthermore, Japanese Patent Laid-Open No. 2020-001253 describes a system in which a character string including a file path of a printed matter is embedded in a two dimensional code. Using this technique, it is possible to create and display a two dimensional code in which a path of a receipt image is embedded, read the two dimensional code with a multifunction peripheral, and print a receipt image acquired from the path.

However, in Japanese Patent Laid-Open No. 2021-196663, it is assumed that a receipt image exists, and in Japanese Patent Laid-Open No. 2020-001253 as well, it is assumed that an image to be printed exists, and thus if there is no receipt image, the expense adjustment service cannot be used and the printed matter cannot be output. For example, if a receipt is not issued for the expenses paid through the cashless service, a receipt image needs to be created manually from the web page. In addition, even if the receipt image has been created, a task to associate the receipt image with the settlement data of the cashless service is required. As described above, in the known technique, there is a problem that printing for an expense application cannot be efficiently performed because there is a variety of troubles for a user to print a receipt image.

SUMMARY OF THE INVENTION

The present invention reduces labor of a user and efficiently prints a receipt image.

The present invention has the following configuration. According to one aspect of the present invention, there is provided an information processing apparatus comprising: at least one memory storing at least one program; at least one processor, wherein the at least one program causes the at least one processor to: acquire a data list from an external service; determine whether an image is associated with data selected from the acquired data list; and acquire an image to be associated with the selected data in a case where determination is made that no image is associated with the selected data; save the selected data and the acquired image in association with each other; and generate and save a two dimensional code in which a saving destination of the image is encoded.

According to another aspect of the present invention, there is provided an information processing system comprising an information processing apparatus and a printing apparatus, wherein the information processing apparatus includes: at least one first memory storing at least one first program, and at least one first processor, the at least one first program causing the at least one first processor to: acquire a data list from an external service, determine whether an image is associated with data selected from the acquired data list, acquire an image to be associated with the selected data when determination is made that the image is not associated with the selected data, save the selected data and the acquired image in association with each other, generate and save a two dimensional code in which a saving destination of the image is encoded, and output the saved two dimensional code as an image; and the printing apparatus includes: at least one second memory storing at least one second program, and at least one second processor, the at least one second program causing the at least one second processor to: read the output two dimensional code to acquire an image from a saving destination of the image, and print the acquired image.

According to the present invention, it is possible to efficiently print a receipt image while reducing the labor of the user.

Further features of the present invention will become apparent from the following description of exemplary embodiments with reference to the attached drawings.

BRIEF DESCRIPTION OF THE DRAWINGS

FIGS. 6A, 6B, and 6C are diagrams illustrating a screen of a client terminal.

FIG. 7 is a sequence diagram illustrating a flow of a printing process.

FIG. 8 is a flowchart illustrating details of a process of creating a QR code.

DESCRIPTION OF THE EMBODIMENTS

Figure 1:
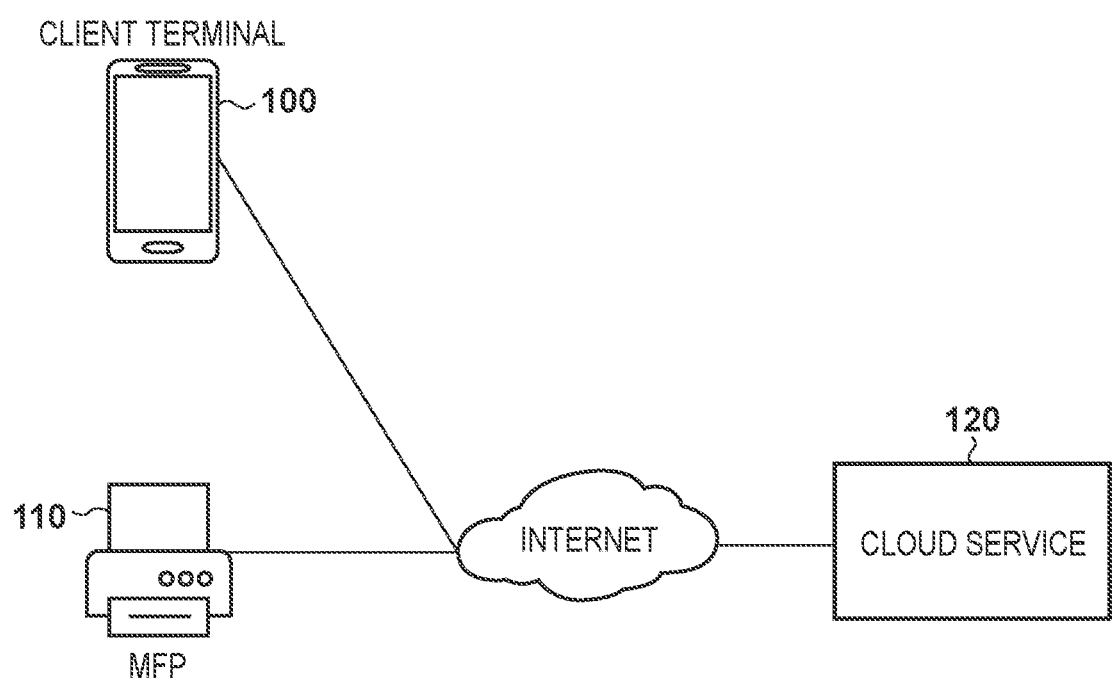
FIG. 1 is an overall system diagram.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

System Configuration

FIG. 1 illustrates a system configuration of an information processing system according to the present embodiment. A client terminal 100 is a mobile terminal such as a smartphone or a tablet terminal. An MFP110 is a multifunction peripheral having a plurality of functions such as a scanner and a printer. The MFP110 may be referred to as an image forming apparatus or a printing apparatus. A cloud service 120 is a cashless service such as a mobile settlement service. Although a service is intangible, a server that provides a service by a computer or an information processing apparatus is also referred to as a service. Therefore, the cloud service 120 may be referred to as the cloud server 120.

According to the configuration of FIG. 1, the client terminal 100 can refer to the usage history of the cloud service 120 and create a code, for example, a QR code (registered trademark) including a saving destination of an image (receipt image) of a receipt (also referred to as a voucher). The MFP 110 can acquire a receipt image from the client terminal 100 or the cloud service 120 and print a receipt by reading the QR code created by the client terminal 100.

In the present embodiment, the client terminal 100 and the MFP 110 realize cooperation with the cloud service 120 using a mechanism of authentication authorization such as OAuth.

Each component of FIG. 1 is communicatively connected by a network. For example, the network may be the Internet, an access line, or the like, and is, for example, any of a LAN, a WAN, a telephone line, or the like. Alternatively, the communication network is a communication network realized by a combination thereof. The network merely needs to be able to transmit and receive data. The client terminal 100 and the MFP 110 are connected to, for example, a local area network (LAN), and can access the Internet via the LAN.

In the present embodiment, the cashless service is given as an example of the cloud service, but the type of the cloud service and the number of services that can be cooperated with each other are not limited to those in the present embodiment.

[Hardware Configuration of Client Terminal]

Figure 2:
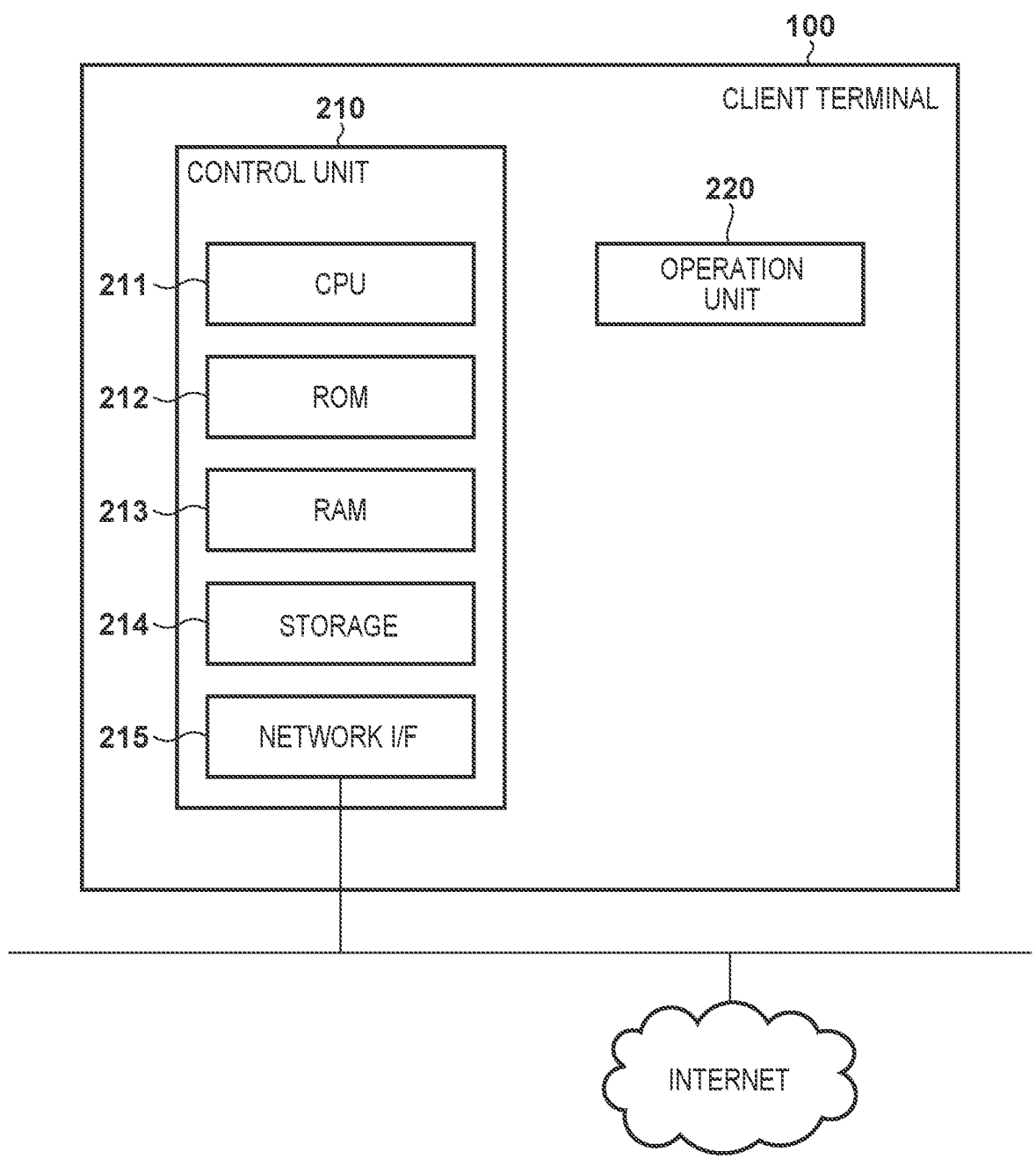
FIG. 2 is a hardware configuration diagram of an MFP.

FIG. 2 is a hardware configuration diagram of the client terminal 100. The client terminal 100 includes a control unit 210 and an operation unit 220.

The control unit 210 includes the following units 211 to 215, and controls the operation of the entire client terminal 100. The CPU 211 reads a program stored in the ROM 212 and executes various processes to control the operation of the entire terminal. The RAM 213 is used as a temporary storage area such as a work area and a main memory of the CPU 211. Note that, in the present embodiment, one CPU 211 executes each process illustrated in a flowchart to be described later using one memory (the RAM 213 or the storage 214), but the present invention is not limited thereto. For example, a plurality of CPUs or a plurality of RAMs or storages may cooperate to execute each process. The storage 214 is a mass storage unit that stores image data and various programs. A network I/F 215 is an interface that connects the client terminal 100 to the Internet. The client terminal 100 communicates with other apparatuses (such as the cloud service 120) via the network I/F 315, and transmits and receives various types of information.

An operation unit 220 includes a touch panel, and accepts an operation, an input, or an instruction from a user, and displays a screen corresponding to the operation, the input, or the instruction.

[Hardware Configuration of MFP]

Figure 3:
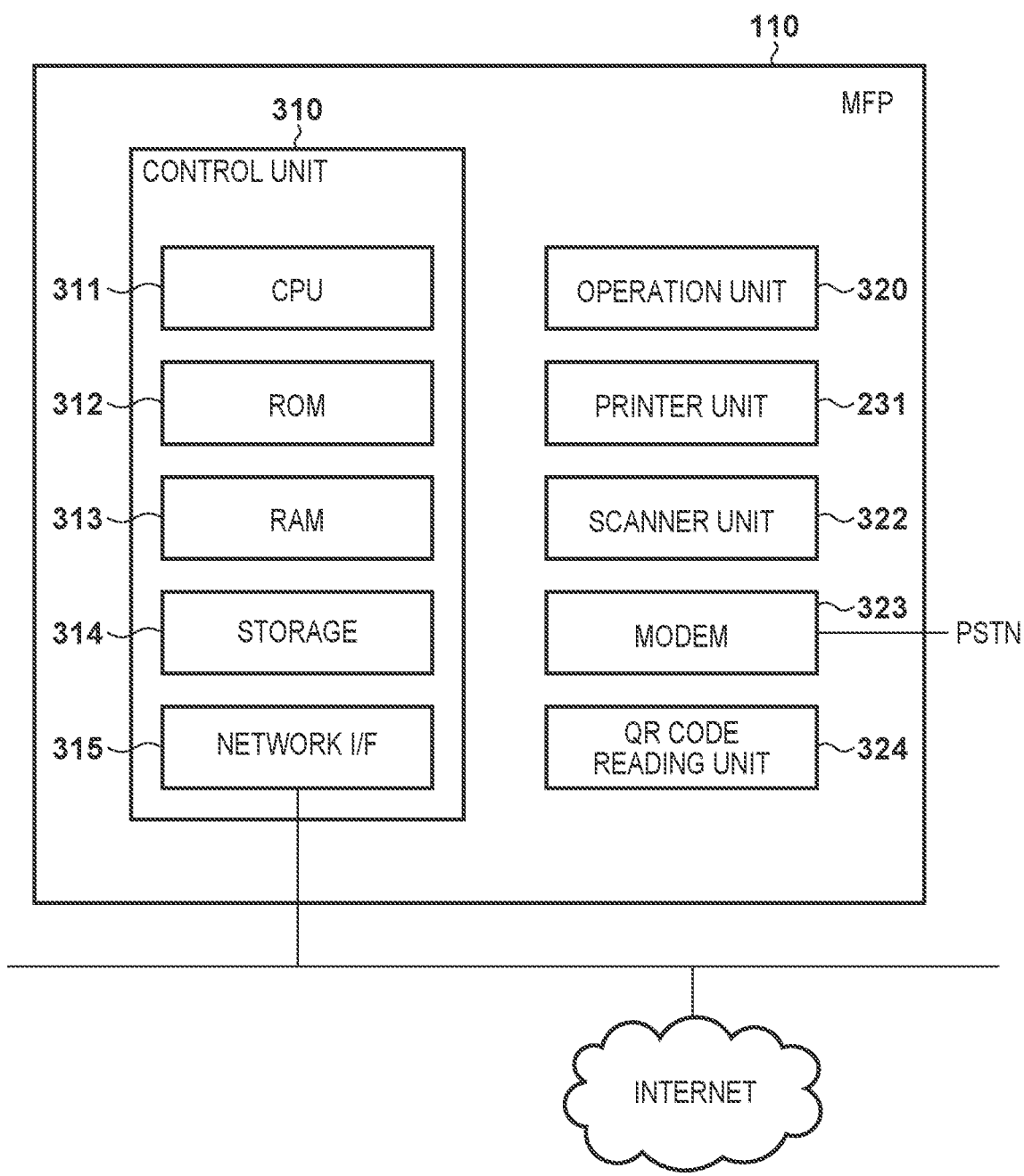
FIG. 3 is a hardware configuration diagram of a client terminal.

FIG. 3 is a hardware configuration diagram of the MFP 110. The MFP 110 includes a control unit 310, an operation unit 320, a printer unit 321, a scanner unit 322, a modem 323, and a QR code reading unit 324. The control unit 310 includes the following units 311 to 319 and controls the operation of the entire MFP 110. The CPU 311 reads a program stored in the ROM312, executes various functions of the MFP110, such as image reading, printing, and communication, and controls the entire apparatus. The RAM 313 is used as a temporary storage area such as a work area and a main memory of the CPU 311. Note that, in the present embodiment, one CPU 311 executes each process illustrated in a flowchart to be described later using one memory (the RAM 313 or the storage 314), but the present invention is not limited thereto. For example, a plurality of CPUs or a plurality of RAMs or storages may cooperate to execute each process. The storage 314 is a mass storage unit that stores image data and various programs. A network I/F 315 is an interface that connects the control unit 310 (MFP 110) to a LAN. The MFP 110 communicates with other apparatuses (such as the cloud service 120) via the network I/F 315 to transmit and receive various types of information.

The operation unit 320 includes a touch panel, a button, and the like, and accepts an operation, an input, or an instruction by a user. The printer unit 321 prints image data for printing transferred from the control unit 310 on a recording medium. The scanner unit 322 reads a document set on a document table or an auto document feeder, generates image data, and inputs the image data to the control unit 310. The MFP 110 can print out (copy) the image data generated by the scanner unit 322 from the printer unit 331, and can also transmit a file or send an e-mail. The modem 323 performs facsimile communication of image data with a facsimile equipment on the PSTN.

The QR code reading unit 324 reads various text data included in a QR code, and inputs the text data to the control unit 310. In the present embodiment, a saving destination or the like of the receipt image is acquired based on the text data extracted by the QR code reading unit 324 of the MFP 110, the receipt image is downloaded from the client terminal 100, the cloud service 120, or the like via the network I/F 315, and the receipt image is printed. Note that, in a case where the QR code reading unit is realized by software, the QR code reading unit 324 may not be provided as hardware.

[Software Configuration of Entire System]

Figure 4:
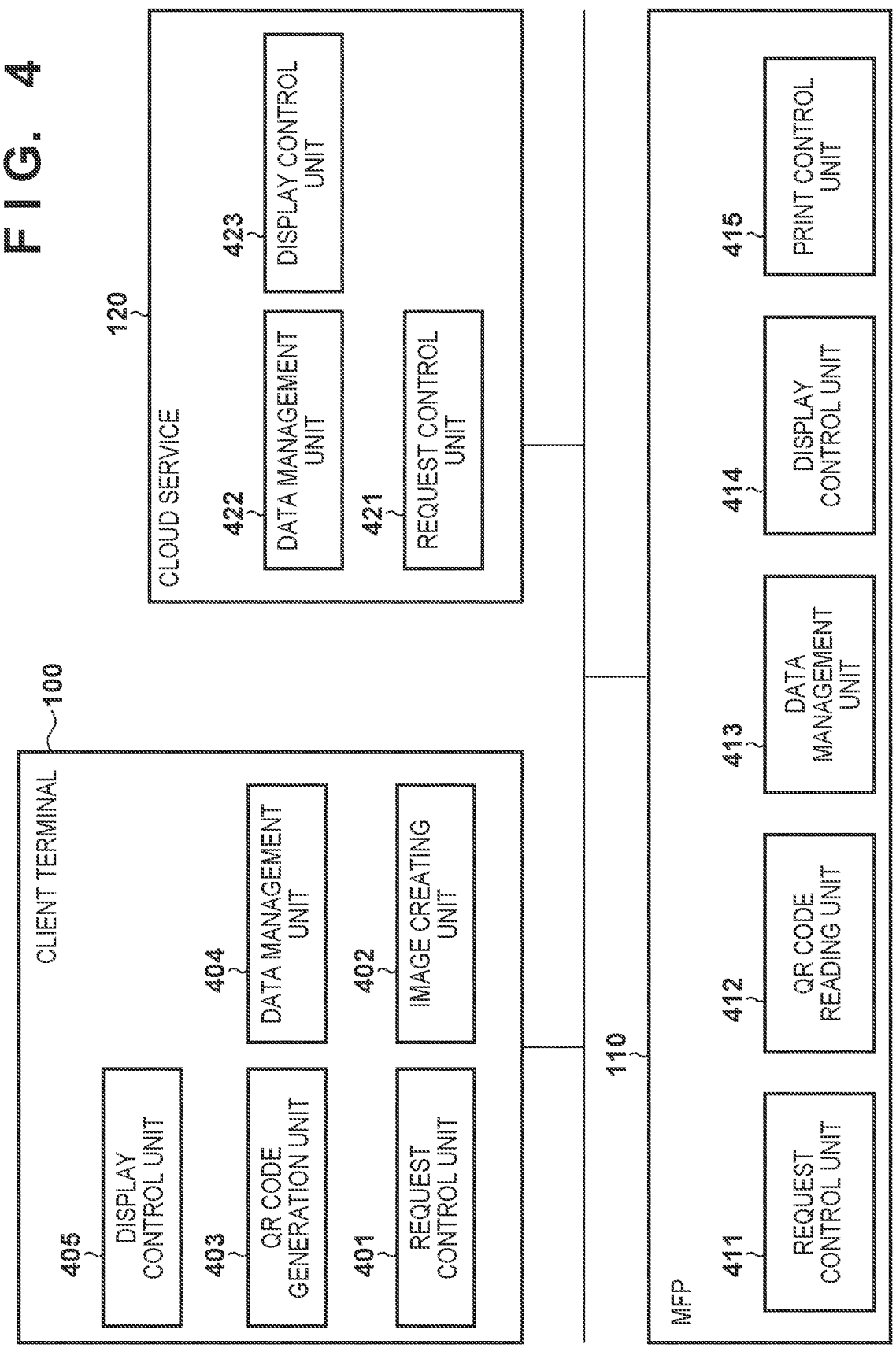
FIG. 4 is a software configuration diagram of the entire system.

FIG. 4 is a software configuration diagram of the entire system according to the present embodiment. The client terminal 100 includes a request control unit 401, an image creating unit 402, a QR code generation unit 403, a data management unit 404, and a display control unit 405.

The request control unit 401 requests the cloud service 120 to perform various types of processes. For example, a login to the service and an acquisition request for settlement data are made. The settlement data includes various kinds of information such as the issuing source of the receipt, the date, the amount, the saving destination of the receipt image, and the saving destination of the thumbnail image. When the settlement data is not associated with the receipt image, the settlement data does not include information related to the image such as a saving destination of the receipt image or a saving destination of the thumbnail image. The communication with the cloud service 120 uses a protocol such as REST or SOAP, but other communication means may be used.

The image creating unit 402 creates a receipt image based on the issuing source, the date, the amount, and the like of the receipt included in the settlement data. In the present embodiment, the client terminal 100 acquires a thumbnail image from the cloud service 120, but a method for acquiring a thumbnail image is not limited thereto. For example, the request control unit 401 of the client terminal 100 may download a receipt image from the cloud service 120, and the image creating unit 402 of the client terminal 100 may generate a thumbnail image. Alternatively, the thumbnail image may be created based on the receipt image created by the image creating unit 402.

The QR code generation unit 403 generates a QR code storing a saving destination of the receipt image, print settings, and the like. The saving destination of the receipt image includes either the saving destination of the receipt image acquired by the request control unit 401 from the cloud service 120 or the saving destination of the receipt image created by the image creating unit 402. The print settings include general settings (color/monochrome, single-sided/double-sided, etc.) for printing on a paper.

The data management unit 404 saves, in the storage 214, the receipt image generated by the image creating unit 402, connection information of the cloud service 120 to which the client terminal 100 is connected, temporary data used in various processes, and the like.

The display control unit 405 accepts a request from an application operating on the client terminal 100 and returns screen configuration information necessary for screen display. When the user operates the application screen (FIGS. 6A to 6C) and selects the settlement data of the cloud service 120, the QR code 613 storing the information and the thumbnail image 611 of the receipt are displayed. In addition, a receipt image can be uploaded to the cloud service 120 by pressing a receipt registration button 603 on the settlement data list screen 600 when settlement data is selected. This makes it possible to manage the settlement data and the receipt image in association with each other. The print setting can be set via the UI screen (display control unit 405).

The MFP 110 includes a request control unit 411, a QR code reading unit 412, a data management unit 413, a display control unit 414, and a print control unit 415.

The request control unit 411 makes a request for various types of processes to the client terminal 100 and the cloud service 120. For example, an acquisition request such as login to a service or download of a receipt image is made. For communication with the client terminal 100 and the cloud service 120, protocols such as REST and SOAP are used, but other communication media may be used.

The QR code reading unit 412 analyzes the QR code and reads a saving destination of the receipt image included in the QR code, print settings, and the like. More specifically, the QR code reading unit 412 extracts various text data included in the optically read QR code and inputs the text data to the control unit 310. In the present embodiment, a saving destination of a receipt image, print settings, and the like are acquired based on text data extracted by the QR code reading unit 412 of the MFP 110. Furthermore, the receipt image is downloaded from the client terminal 100, the cloud service 120, or the like, which is the acquired saving destination, via the network I/F 315, and the receipt image is printed. The QR code reading unit 412 may be realized by hardware.

The data management unit 413 saves image data such as a receipt image downloaded from the client terminal 100 or the cloud service 120 in the storage 314.

The display control unit 414 displays the progress of the printing process and displays a user interface (UI) screen for accepting an operation by the user on a liquid crystal display unit having a touch panel function of the operation unit 220 of the MFP 110.

The print control unit 415 automatically prints the receipt image downloaded by the QR code reading unit 412 reading the QR code. In the present embodiment, printing is started by setting print settings in the client terminal 100 and reading the QR code, but the printing method is not limited thereto. For example, an instruction such as input of authentication information for accessing the cloud service 120, print setting, and print start operation may be accepted via the UI screen (display control unit 414) of the MFP 110, and the printing process may be executed.

The cloud service 120 includes a request control unit 421, a data management unit 422, and a display control unit 423.

The request control unit 421 executes processes corresponding to a processing request from the client terminal 100 or the MFP 110, for example, a settlement data acquisition request (settlement data acquisition request) as appropriate, and responds to a result of the processing request.

The data management unit 422 holds the image data of the receipt and the settlement data saved in the cloud service 120. These pieces of data may be saved in association with the user. For example, when the cloud service 120 accepts a request to download a receipt image from the MFP 110, the request control unit 421 acquires the designated receipt image from the data management unit 422 and responds as a result of the processing request. Similarly, when accepting a request to acquire settlement data, the request control unit 421 acquires the settlement data of the designated receipt from the data management unit 422 and responds as a result of the processing request.

The display control unit 423 accepts a request from a web browser operating on the client terminal 100 and returns screen configuration information (HTML, CSS, etc.) necessary for screen display. The user can refer to image data, settlement data, and the like saved in the cloud service 120 via a screen displayed by the web browser.

[Processing Details of the MFP Cooperative Service According to the First Embodiment]

Figure 5:
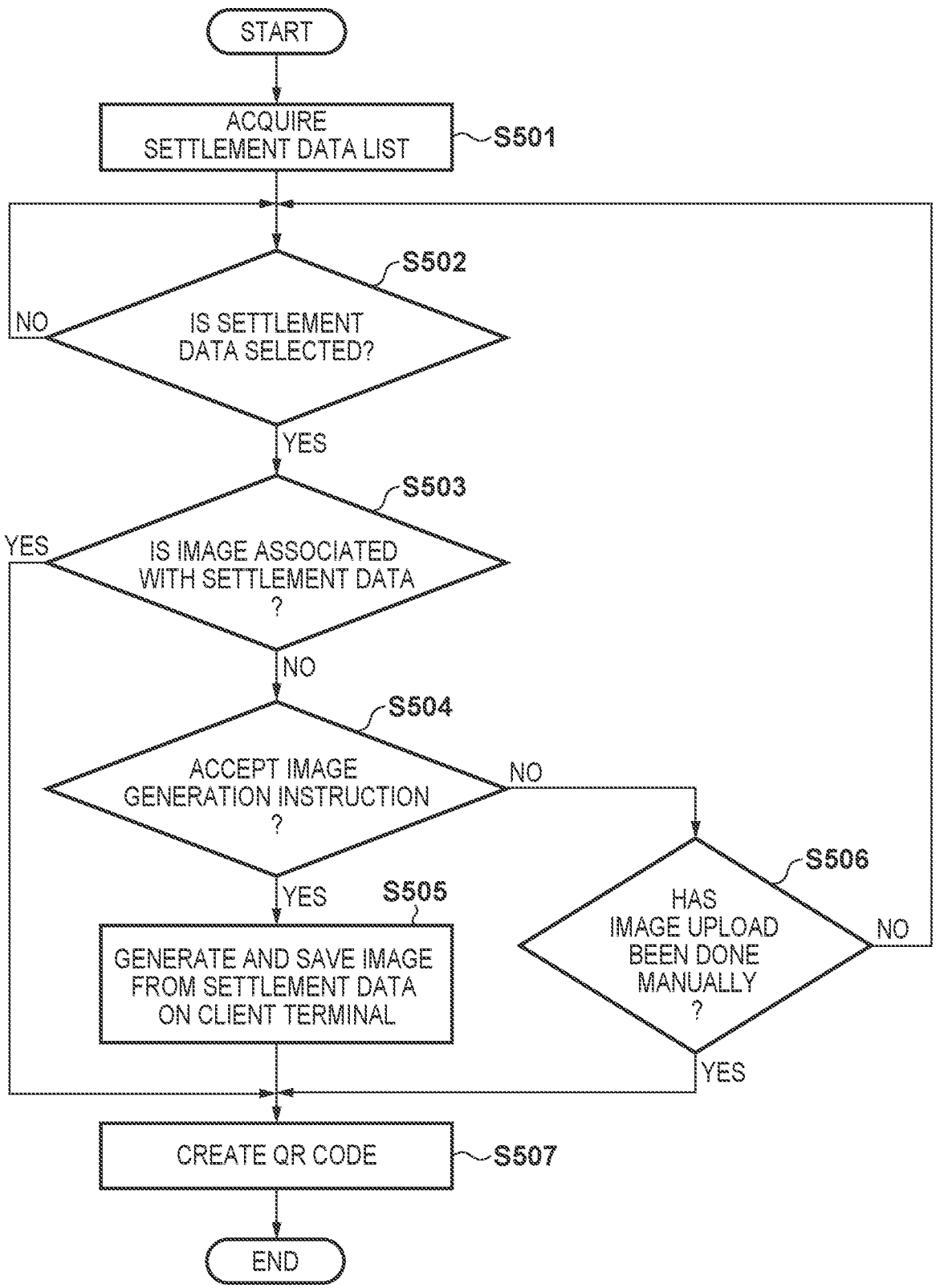
FIG. 5 is a flowchart illustrating details of a process of creating a QR code.

FIG. 5 is a flowchart illustrating the details of a process in which the client terminal 100 creates a QR code. This QR code is used in the process of printing a receipt in the sequence of FIG. 7, and details of the sequence will be described later. Note that, in the control unit 210 of the client terminal 100, the CPU 211 executes a control program stored in the storage 214 to implement a series of processes of the present flowchart. The foregoing will be described in more detail below.

In the present embodiment, the process is started when the display control unit 405 of the client terminal 100 detects that an operation of displaying a settlement data list of the cloud service 120 has been accepted.

In S501, the request control unit 401 of the client terminal 100 transmits an acquisition request of the settlement data list to the cloud service 120. The settlement data includes the issuing source of the receipt, the date, the amount, and the like. In response to the settlement data list acquisition request, the cloud service 120 transmits the settlement data list to the request source. When the settlement data list is acquired, it is displayed as a settlement data list 601 on a settlement data list screen 600 shown in FIG. 6A. The settlement data list to be acquired may be, for example, a settlement data list of transactions settled by a user who is logged in to the client terminal 100. In this case, the settlement data list acquisition request also includes identification information of the user. The settlement data list includes, for each settlement, a name related to settlement, for example, a name of an issuing source of a receipt, and link information to a receipt image associated with the settlement data. For settlement data having no associated receipt image, the link information to the receipt image may not be included.

In S502, the display control unit 405 of the client terminal 100 determines which settlement data in the settlement data list 601 is selected on the settlement data list screen 600 and the Next button 602 is pressed. When the Next button is pressed, the process proceeds to S503, and when the Next button is not pressed, the process proceeds to S502 again.

In S503, the request control unit 401 of the client terminal 100 determines whether or not a receipt image is associated with the selected settlement data. When the receipt image is associated, the process proceeds to S506, and when the receipt image is not associated, the process proceeds to S504.

In S504, the display control unit 405 of the client terminal 100 displays a message screen 620 for selecting how to associate the receipt image with the settlement data (shown in FIG. 6C). The message screen 620 includes, for example, settlement data 623, a button 621 for instructing image generation, and a button 622 for instructing image upload. When "generate receipt image from settlement data" 621 is selected, the process proceeds to S505, and when "upload receipt image to cloud service 120" 622 is selected, the process proceeds to S506.

In S505, the image creating unit 402 of the client terminal 100 creates a receipt image from the settlement data. For example, a receipt image is created based on an issuing source, a date, an amount, and the like included in the settlement data, and is saved in the data management unit 404. The receipt image may be generated by applying the issuing source, date, amount, and the like to the template. The template to use may be selected from a plurality of candidates, or may be determined in advance. The created receipt image may be saved in the client terminal 100 in association with the settlement data. The saving destination is used in step S507.

In S506, the display control unit 405 of the client terminal 100 displays a UI for uploading the receipt image to the cloud service 120, and determines whether an upload operation has been accepted. When the upload operation is accepted, the process proceeds to S507, and when the upload operation is not accepted (when the operation is canceled), the process proceeds to S502. When the user uploads the receipt image to the cloud service 120, the request control unit 401 transmits an upload request of the receipt image to the cloud service 120. Note that, with respect to this upload request, the client terminal 100 can upload the receipt image and then acquire the saving destination of the receipt image as a response from the cloud service 120. The receipt image may be, for example, an image of a receipt created by the client terminal 100 using an application, a service or the like of accounting of an external service. Alternatively, for a transaction with a receipt already issued on paper, an image obtained by photographing the paper receipt may be uploaded for the purpose of digitizing the receipt.

In S507, the QR code creating unit 403 of the client terminal 100 creates a QR code storing a saving destination of the receipt image and print settings. The QR code includes an encoded saving destination and print settings. In the present embodiment, the saving destination of the receipt image varies depending on the executed process. For example, the saving destination of the receipt image acquired from the cloud service 120 or uploaded to the cloud service 120 in the process of S501, S502, or S506 is any directory of the cloud service 120. On the other hand, the saving destination of the receipt image acquired in the process of S505 is any directory of the client terminal 100. The created QR code is saved in association with the settlement data.

The saved QR code can be read and displayed, for example, on the client terminal 100 as illustrated in the display screen 610 of FIG. 6B. By saving the display screen 610 as an image, the saved display screen 610 can be displayed using, for example, an application for displaying an image.

Furthermore, the print settings to be included in the QR code include, for example, general settings for printing paper (color/monochrome, single-sided/double-sided, etc.), and these settings can be set by a UI (not illustrated) of the client terminal 100.

The method for creating a QR code including information on a receipt image has been described above. In the present embodiment, the receipt image created as in S505 is saved in the client terminal 100, but the receipt image created in the client terminal 100 may be uploaded to the cloud service 120, an external cloud storage service, or the like.

[Flow of Process Between Devices in the First Embodiment]

FIG. 7 is a sequence diagram illustrating a flow of processes between the apparatuses when printing a receipt image by the MFP 110. Here, the description will be centered on the exchange between the apparatuses. This process is started when the QR code reading unit 412 of the MFP110 reads the QR code 612 displayed on the UI screen (QR code display screen 610) of the client terminal 100. The reading may be started when, for example, the user touches a reading instruction button or the like on the UI provided by the QR code reading unit 412. In the following description, process by each apparatus is mainly performed by a software module included in the apparatus. However, since the software module is realized by executing the program by the CPU of each apparatus, the executing main body may be considered as the CPU of each apparatus.

In S701, the QR code reading unit 412 of the MFP 110 reads and acquires the QR code 612 displayed on the UI screen (QR code display screen 610) of the client terminal 100 by the scanner unit 321.

In S702, the QR code reading unit 412 of the MFP 110 analyzes the character string stored in the acquired QR code 612. For example, the information obtained by the analysis includes a saving destination of the receipt image and print setting.

In S703 and S704, the request control unit 411 of the MFP 110 designates a saving destination of the receipt image acquired in S702 based on the analysis result, and transmits a request for image download. In a case where the receipt image is created in step S505, the saving destination is the client terminal 100. On the other hand, in a case where the receipt image is saved in the cloud service 120 in association with the settlement data or uploaded from the client terminal 100, the saving destination is the cloud service 120.

In S703, when the saving destination of the receipt image is the client terminal 100, the MFP 110 transmits a request for image download to the client terminal 100.

In S704, when the saving destination of the receipt image is the cloud service 120, the MFP 110 transmits a request for image download to the cloud service 120.

After transmitting the request according to the saving destination of the receipt image, the MFP 110 temporarily saves the image received from the cloud service 120 in the data management unit 413.

In S705, the print control unit 415 of the MFP 110 prints the receipt image saved in the data management unit 413.

The printing method using the QR code has been described above. In the known method, it took a lot of time and effort to print a receipt image, but the method of the present embodiment can print a receipt through a simple method. As a result, for example, printing of a receipt for an expense application can be efficiently performed.

Second Embodiment

[Processing Details of the MFP Cooperative Service According to the Second Embodiment]

In the first embodiment (FIG. 5) described above, the receipt image is created on the client terminal 100, but the method of creating the receipt image is not limited thereto. For example, in a case where a receipt image can be created by an external system instead of the client terminal 100, it is conceivable to create the receipt image on the external system. Therefore, in the second embodiment (FIG. 8), a method of creating a receipt image on an external system will be described. In the present embodiment, descriptions similar to those of the first embodiment such as a system configuration and a UI of an application will be omitted.

FIG. 8 is a flowchart illustrating the details of a process in which the client terminal 100 creates a QR code. This QR code is used in the process of printing a receipt in the sequence of FIG. 8, and details of the sequence will be described later. Note that, in the control unit 210 of the client terminal 100, the CPU 211 executes a control program stored in the storage 214 to implement a series of processes of the present flowchart. The foregoing will be described in more detail below.

In the present embodiment, the process is started when the display control unit 405 of the client terminal 100 detects that an operation of displaying a settlement data list of the cloud service 120 has been accepted.

In S805, the request control unit 401 of the client terminal 100 transmits a request for creating a receipt image to the cloud service 120 or an external system such as an external receipt image creating service together with the settlement data selected on the settlement data list screen 600. The client terminal 100 receives the receipt image created by the external system as a response and saves the same in the data management unit 404. In the present embodiment, the data management unit 404 of the client terminal 100 is designated as the saving destination of the receipt image, but the acquired receipt image may be saved in another place such as an arbitrary storage service. In addition, in a case where the function of saving image data is also provided in the external system that has created the receipt image, the receipt image may not be acquired by the client terminal 100. When the receipt image is saved in a place other than the client terminal 100, the saving destination of the receipt image stored in the QR code becomes the storage service or the saving destination of the receipt image on the external system.

The method for creating a QR code including information on a receipt image has been described above. As a result, the MFP 110 can acquire the receipt image from the external system, so that the receipt image can be efficiently printed.

In the present embodiment, image data acquisition process is performed twice such that the receipt image created by the external system is received by the client terminal 100 with the receipt image as a response (FIG. 8), and the MFP 110 further acquires the receipt image from the client terminal 100 (FIG. 7). Since it is not an efficient process to propagate the same receipt image in a plurality of systems, this problem may be resolved by storing other information instead of the saving destination of the receipt image with respect to the QR code. For example, a request for creating a receipt image with respect to an external system may be stored in a QR code, and the MFP 110 that has read from the QR code may execute the request for creating a receipt image with respect to the external system. As a result, the client terminal 100 does not need to acquire the receipt image from the external system, and the MFP 110 can directly acquire the receipt image from the external system, so that efficient receipt image acquiring process can be realized.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-065220, filed Apr. 12, 2023 which is hereby incorporated by reference herein in its entirety.

What is claimed is:

1. An information processing apparatus comprising:
at least one memory storing at least one program;
at least one processor, wherein the at least one program causes the at least one processor to:
acquire a settlement data list from an external service;
determine whether a receipt image is associated with settlement data selected from the acquired settlement data list;

determine whether to upload or generate a receipt image to be associated with the selected settlement data according to a user instruction in a case where a determination is made that no receipt image is associated with the selected settlement data;

obtain a storage location where the receipt image to be associated with the selected settlement data has been uploaded in a case where upload of the receipt image is instructed;

generate and save a receipt image to be associated with the selected settlement data based on the settlement data in a case where generation of the receipt data is instructed;

generate a two dimensional code in which a location where the receipt image has been uploaded is encoded or a two dimensional code in which a location where the receipt image generated has been stored is encoded; and save the selected settlement data and the two dimensional code associated with each other.

2. The information processing apparatus according to claim 1, wherein the at least one program causes the at least one processor to:

output the saved two dimensional code as an image.

3. The information processing apparatus according to claim 1, wherein the generating the receipt image includes generating the receipt image by applying the settlement data to a template.

4. The information processing apparatus according to claim 1, wherein the generating the receipt image to be associated with the selected settlement data includes generating the image by an external system in response to an instruction to generate a receipt image and acquiring the generated receipt image.

5. The information processing apparatus according to claim 1, wherein the generating the receipt image to be associated with the selected data includes uploading an image generated by an external system and acquiring a location where the receipt image is uploaded.

6. The information processing apparatus according to claim 1, wherein when determining that the receipt image is associated with the selected settlement data, a two dimensional code in which a location where the receipt image is encoded is generated.

7. A non-transitory computer-readable storage medium storing a program that, when loaded to a computer and executed, causes the computer to perform a process, the process comprising:

acquiring a settlement data list from an external service;

determining whether a receipt image is associated with settlement data selected from the acquired settlement data list;

determining whether to upload or generate a receipt image to be associated with the selected settlement data according to a user instruction in a case where a determination is made that no receipt image is associated with the selected settlement data;

obtaining a storage location where the receipt image to be associated with the selected settlement data has been uploaded in a case where upload of the receipt image is instructed;

generating and saving a receipt image to be associated with the selected settlement data based on the settlement data in a case where the generation of the receipt data is instructed;

generating a two dimensional code in which a location where of the receipt image has been uploaded is encoded or a two dimensional code in which a location where the receipt image generated has been stored is encoded; and saving the selected settlement data and the two dimensional code associated with each other.

8. An information processing system comprising an information processing apparatus and a printing apparatus, wherein the information processing apparatus includes:

at least one first memory storing at least one first program, and at least one first processor, the at least one first program causing the at least one first processor to:

acquire a settlement data list from an external service, determine whether a receipt image is associated with settlement data selected from the acquired settlement data list, determine whether to upload or generate a receipt image to be associated with the selected settlement data according to a user instruction in a case where a determination is made that no receipt image is associated with the selected settlement data, obtain a storage location where the receipt image to be associated with the selected settlement data has been uploaded in a case where upload of the receipt image is instructed, generate and save a receipt image to be associated with the selected settlement data based on the settlement data in a case where the generation of the receipt data is instructed, generate a two dimensional code in which a location where the receipt image has been uploaded is encoded or a two dimensional code in which a location where the receipt image generated has been stored is encoded;

save the selected settlement data and the two dimensional code associated with each other, and output the saved two dimensional code as an image; and the printing apparatus includes:

at least one second memory storing at least one second program, and at least one second processor, the at least one second program causing the at least one second processor to:

read the output two dimensional code to acquire an image from a saving destination of the image, and print the acquired image.

* * * * *